United States Patent
Demirkaya (10) Patent No.: US 10,603,663 B2
(45) Date of Patent: Mar. 31, 2020

(54) INTERIOR VESSEL OF A SIMULATION CABINET AND SIMULATION CABINET WITH AN INTERIOR VESSEL

(71) Applicant: BINDER GmbH, Tuttlingen (DE)

(72) Inventor: Vedat Demirkaya, Obernburg (DE)

(73) Assignee: VEGA GRIESHABER KG, Wolfach (DE)

( * ) Notice: Subject to any disclaimer, the term of this patent is extended or adjusted under 35 U.S.C. 154(b) by 87 days.

(21) Appl. No.: 14/963,524

(22) Filed: Dec. 9, 2015

(65) Prior Publication Data
US 2016/0184816 A1   Jun. 30, 2016

(30) Foreign Application Priority Data

Dec. 16, 2014 (DE) .................. 20 2014 010 516 U
Sep. 30, 2015 (DE) .................. 10 2015 116 630

(51) Int. Cl.
| | | |
|---|---|---|
| *B01L 99/00* | (2010.01) | |
| *B01L 3/00* | (2006.01) | |
| *F16B 5/00* | (2006.01) | |
| *B01L 1/02* | (2006.01) | |

(52) U.S. Cl.
CPC ............... *B01L 3/508* (2013.01); *B01L 1/025* (2013.01); *F16B 5/0036* (2013.01); *B01L 2200/025* (2013.01); *B01L 2200/141* (2013.01)

(58) Field of Classification Search
CPC ...... B01L 1/00; B01L 1/025; B01L 2200/141; G01N 17/00; G01N 17/002; C12M 41/14
See application file for complete search history.

(56) References Cited

U.S. PATENT DOCUMENTS

| | | | |
|---|---|---|---|
| 3,009,582 A | 11/1961 | Degener | |
| 4,681,381 A * | 7/1987 | Sevey ................. | A47B 88/044 312/333 |
| 4,708,252 A | 11/1987 | Azzi | |
| 5,309,981 A | 5/1994 | Binder | |
| 2005/0019904 A1 | 1/2005 | Zurur et al. | |
| 2009/0195129 A1 | 8/2009 | Osawa et al. | |
| 2014/0110391 A1 | 4/2014 | Estrella et al. | |

FOREIGN PATENT DOCUMENTS

| | | |
|---|---|---|
| CN | 203 123 982 U | 8/2013 |
| DE | 3329855 A1 | 9/1982 |
| DE | 20 2014 005 166 U1 | 6/2014 |
| WO | WO 2009/022847 A1 | 2/2009 |
| WO | WO 2012/02679 A1 | 5/2012 |

OTHER PUBLICATIONS

SIPO office action for related Chinese application 201510952296.1 dated Jun. 7, 2017.

* cited by examiner

*Primary Examiner* — Paul S Hyun
(74) *Attorney, Agent, or Firm* — William Gray Mitchell (57) ABSTRACT

The invention is an interior vessel of a simulation cabinet, with at least two hook-shaped fastening elements being arranged at the interior vessel for fastening at a housing of the simulation cabinet, and a simulation cabinet comprising such an interior vessel and a housing, with the housing showing engagement elements, which can be engaged by the hook-shaped fastening elements.

6 Claims, 6 Drawing Sheets

INTERIOR VESSEL OF A SIMULATION CABINET AND SIMULATION CABINET WITH AN INTERIOR VESSEL

CROSS REFERENCE TO RELATED APPLICATIONS

This patent application claims priority to each of German Patent Application 20 2014 010 516.2, filed on Dec. 16, 2014, and German Patent Application 10 2015 116 630.5, filed on Sep. 30, 2015.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to an interior vessel of a simulation cabinet and a simulation cabinet comprising such an interior vessel.

Background of the Invention

Simulation cabinets are used in scientific and industrial laboratories for the simulation of bio-logical, chemical, and/or physical influences of the environment. A simulation cabinet comprises an interior vessel and a housing, with the interior vessel being arranged in said housing and is fastened thereat.

A simulation cabinet as a laboratory heating cabinet is known from DE 4 116 500 A1, for example.

In simulation cabinets of prior art the problem arises that by the fastening of the interior vessel at the housing a contact develops between the interior vessel and the housing, which compromises the simulated environment in an interior chamber of the interior vessel, particularly the temperature distribution, due to heat bridges developing.

The objective of the invention is to provide an interior vessel and a simulation cabinet, each with a fastening of the interior vessel at a housing of the simulation cabinet, showing a simple design and with here any contact between the interior vessel and the housing being largely avoided.

The object of the invention is attained in an interior vessel according to claim 1 and a simulation cabinet with such an interior vessel showing the features of claim 11.

BRIEF SUMMARY OF THE INVENTION

In a preferred embodiment, an interior vessel of a simulation cabinet, with at least two hook-shaped fastening elements being arranged at the interior vessel for fastening at a housing of the simulation cabinet.

In another preferred embodiment, the interior vessel as described herein, further comprising wherein at least one sheet-metal strip is arranged at the interior vessel with a first longitudinal edge and a second longitudinal edge, each essentially parallel in reference to a longitudinal axis of the sheet-metal strip, with the sheet-metal strip comprising at least one, preferably several recesses each forming one of the hook-shaped fastening elements.

In another preferred embodiment, the interior vessel as described herein, wherein the sheet-metal strip is arranged at an angle ($\alpha 1$) at the interior vessel, with preferably the second longitudinal edge of the sheet-metal strip being arranged at the interior vessel and particularly preferred the angle ($\alpha 1$) amounting essentially to 90°.

In another preferred embodiment, the interior vessel as described herein, wherein the sheet-metal strip is arranged at a first side wall of the interior vessel and another sheet-metal strip at a second side wall of the interior vessel opposite the first side wall.

In another preferred embodiment, the interior vessel as described herein, wherein that the first longitudinal edge shows an undercut formed by the recess.

In another preferred embodiment, the interior vessel as described herein, wherein the recess shows a frame comprising at least:
 a first frame side with a first end and a second end,
 a second frame side with a first end and a second end,
 a third frame side with a first end and a second end,
with
 the first end of the first frame side being arranged at the first longitudinal edge of the sheet-metal strip and the first frame side being arranged at a first angle ($\beta 1$), which is smaller or equal to 90°, in reference to a first longitudinal edge,
 the first end of the second frame side being arranged at the second end of the first frame side and the second frame side being arranged at a second angle ($\gamma 1$), which is smaller than 180°, in reference to the first frame side, preferably essentially perpendicular in reference to the longitudinal axis of the sheet-metal strip, and
 the first end of the third frame side being arranged at the second end of the second frame side and the second end of the third frame side being arranged at the first longitudinal edge.

In another preferred embodiment, the interior vessel as described herein, wherein the third frame side comprises at least
 a first section with a first end and a second end and
 a second section with a first end and a second end,
with
 the first end of the first section being arranged at the second end of the second frame side,
 the second end of the second section being arranged at the first longitudinal edge, and
 the first section being arranged at an angle ($\epsilon 1$), which is smaller than 180° in reference to the second section.

In another preferred embodiment, the interior vessel as described herein, wherein the third frame side comprises a third section with a first end and a second end, with the first end of the third section being arranged at the second end of the first section and the second end of the third section being arranged at the first end of the second section, with preferably the third section of the third frame side being arranged essentially parallel in reference to the longitudinal axis of the sheet-metal strip.

In another preferred embodiment, the interior vessel as described herein, wherein the first frame side comprises at least
 a first section with a first end and a second end, and
 a second section with a first end and a second end, with
the first end of the first section being arranged at the first longitudinal edge of the sheet-metal strip,
the second end of the second section being arranged at the first end of the second frame side, and
the first section being arranged at an angle (μ1), which is smaller than 180° in reference to the second section.

In another preferred embodiment, the interior vessel as described herein, wherein the first frame side comprises a third section with a first end and a second end, with the first end of the third section being arranged at the second end of the first section, and the second end of the third section being arranged at the first end of the second section, with preferably the third section of the first frame side being arranged essentially parallel to the longitudinal axis of the sheet-metal strip.

In a more preferred embodiment, a simulation cabinet with an interior vessel according as described herein and a housing, wherein the housing comprises engagement elements, which can be engaged by hook-shaped fastening elements.

In another preferred embodiment, the simulation cabinet as described herein, wherein at least one sheet-metal strip with a first longitudinal edge and a second longitudinal edge each being arranged at the housing, essentially parallel to a longitudinal axis of the sheet-metal strip, with the sheet-metal strip comprising at least one, preferably several projections forming the engagement elements.

In another preferred embodiment, the simulation cabinet as described herein, wherein the sheet-metal strip is arranged at an angle (α2) at the housing, with the second longitudinal edge of the sheet-metal strip being arranged at the housing and particularly preferred the angle (α2) amounting essentially to 90°.

In another preferred embodiment, the simulation cabinet as described herein, wherein the sheet-metal strip is arranged at a first side wall of the housing and another sheet-metal strip is arranged at a second side wall of the housing opposite the first side wall.

In another preferred embodiment, the simulation cabinet as described herein, wherein the first longitudinal edge shows an undercut formed by the projection.

In another preferred embodiment, the simulation cabinet as described herein, wherein the projection shows a frame comprising at least:
a first frame side with a first end and a second end, and
a second frame side with a first end and a second end,
with
the first end of the first frame side being arranged at the first longitudinal edge of the sheet-metal strip and the first frame side being arranged at a first angle (β2), which is smaller or equal to 90°, in reference to the first longitudinal edge,
the first end of the second frame side being arranged at the second end of the first frame side and the second end of the second frame side being arranged at the first longitudinal edge.

In another preferred embodiment, the simulation cabinet as described herein, wherein the first frame side comprises at least
a first section with a first end and a second end, and
a second section with a first end and a second end,
with
the first end of the first section being arranged at the first longitudinal edge of the sheet-metal strip and the second end of the first section being arranged at the first end of the second section, with the first section preferably being arranged perpendicular in reference to the longitudinal edge of the sheet-metal strip,
the second end of the second section being arranged at the first end of the second frame side, and
the first section being arranged at an angle (μ2), which is smaller than 180° in reference to the second section.

In another preferred embodiment, the simulation cabinet as described herein, wherein the first frame side comprises a third section with a first end and a second end, with the first end of the third section being arranged at the second end of the first section and the second end of the third section being arranged at the first end of the second section, with preferably the third section of the first frame side being essentially arranged parallel in reference to the longitudinal axis of the sheet-metal strip.

In another preferred embodiment, the simulation cabinet as described herein, wherein the second frame side comprises at least
a first section with a first end and a second end, and
a second section with a first end and a second end,
with
the first end of the first section being arranged at the first end of the second frame side, with the first section preferably being arranged parallel in reference to the longitudinal axis of the sheet-metal strip, and
the second end of the second section being arranged at the first longitudinal edge, and
the first section being arranged at an angle (ε2), which is smaller than 180°, in reference to the second section.

In another preferred embodiment, the simulation cabinet as described herein, wherein the second frame side comprises a third section with a first end and a second end, with the first end of the third section being arranged at the first end of the second frame side and the second end of the third section being arranged at the first end of the first section of the second frame side, with preferably the third section being arranged perpendicular in reference to the longitudinal axis of the sheet-metal strip.

In another preferred embodiment, the simulation cabinet as described herein, wherein the housing comprises at least one engagement element, which can be engaged by the hook-shaped fastening element from a first direction, and with at least a second engagement element, which can be engaged by the hook-shaped fastening element from a second direction opposite the first direction, with particularly the first and the second engagement element being embodied mirror-symmetrical in reference to each other.

In another preferred embodiment, the simulation cabinet as described herein, wherein the engagement element is embodied such that the hook-shaped fastening element can engage the engagement element from two opposite directions, particularly that the engagement element shows a form symmetrical in reference to a lateral axis arranged perpendicular to the longitudinal axis of the sheet-metal strip.

In another preferred embodiment, the simulation cabinet as described herein, wherein the first longitudinal edge shows at least a first section, with its distance from the second longitudinal axis being smaller than a distance from at least a second section of the first longitudinal edge from the second longitudinal edge, with the projection being arranged at the second section.

In another preferred embodiment, the simulation cabinet as described herein, further comprising wherein a level, in which the engagement element is located, forms with a level, in which the hook-shaped fastening element is located, in the engaged state of the hook-shaped fastening element and the engagement element at an angle (δ), preferably an angle (δ) showing essentially 90°.

DETAILED DESCRIPTION OF THE INVENTION

The invention comprises a simulation cabinet wherein at least two hook-shaped fastening elements are arranged at an interior vessel for fastening at a housing of the simulation cabinet. Hook-shaped fastening elements represent a particularly simple means to fasten the interior vessel at the housing of the simulation cabinet. A hook-shaped fastening can advantageously be produced in a particularly simple fashion and detached again, if necessary, namely simply by engaging and disengaging the hook-shaped fastening element. In particular, no additional fastening means are required to fasten the interior vessel at the housing. For example, screws or rivets can be waived. This way, the number of potential heat bridges can be kept low.

Advantageously, at least one sheet-metal strip may be arranged at the interior vessel with a first longitudinal edge and a second longitudinal edge, each essentially arranged parallel in reference to a longitudinal axis of the sheet-metal strip, with the sheet-metal strip at least comprising one, preferably several recesses each forming one of the hook-shaped fastening elements. Such a sheet-metal strip can be produced particularly easily and cost-effectively, for example a sheet-metal strip of a certain length can be simply rolled off a sheet-metal roll and cut off. The recess may be implemented at the sheet-metal strip in a relatively simple fashion, for example by punching. This way, an easily implemented option is provided to generate hook-shaped fastening elements.

The sheet-metal strip is preferably arranged at an angle at the interior vessel, with preferably the second longitudinal edge of the sheet-metal strip being arranged at the interior vessel and in particular showing preferably an angle of essentially 90°. By such an arrangement the hook-shaped fastening element can be inserted particularly easily into a corresponding counterpart.

Advantageously, the sheet-metal strips are arranged at a first side wall of the interior vessel and another sheet-metal strip at a second side wall of the interior vessel, opposite the first side wall. By two sheet-metal strips arranged at respectively opposite side walls of the interior vessel, the interior vessel can be fastened at both sides at a housing of a simulation cabinet, which allows the achievement of a particularly stable fastening. Furthermore, the interior vessel can be fastened at the housing in a self-supporting fashion and showing a high inherent rigidity.

According to a preferred embodiment of the invention, the first longitudinal edge shows an undercut formed by the recess. Here and in the following the term "undercut" refers to a recess of a body, by which a portion of the body freely projects from the remainder of the body. When fastening a fastening element with an undercut, a counterpart, corresponding to said fastening element, engages said undercut. The undercut is a particularly simple and advantageous option to generate a hook-shaped fastening element.

In a further development of the invention the recess shows a frame with at least one first frame side with a first end and a second end, a second frame side with a first end and a second end, a third frame side with a first end and a second end, with the first end of the first frame side being arranged at the first longitudinal edge of the sheet-metal strip, and the first frame side being arranged at a first angle, which is smaller or equivalent to 90° in reference to the first longitudinal edge, the first end of the second frame side being arranged at the second end of the first frame side, and the second frame side at a second angle, which is smaller than 180°,s, in reference to the first frame side, preferably essentially perpendicular to the longitudinal axis of the sheet-metal strip, and the first end of the third frame side being arranged at the second end of the second frame side, and the second end of the third frame side being arranged at the first longitudinal edge. The second end of the third frame side is here particularly arranged at the first longitudinal edge at a point which is different from a point of the first end of the first frame side. During the production of the hook-shaped connection be-tween the hook-shaped fastening element and the corresponding engagement element, due to a first frame side arranged in this fashion, contact areas may be reduced between the hook-shaped fastening element and the engagement element and thus potential heat bridges as well. The second frame side may provide a support for the engagement element when generating the hook-shaped connection.

The third frame side shows advantageously at least one first section with a first end and a second end and a second section with a first end and a second end, with the first end of the first section being arranged at the second end of the second frame side, the second end of the second section being arranged at the first longitudinal edge, and the first section at an angle in reference to the second section, which is smaller than 180°. With the first section and the second section a geometry of the recess can be adjusted to a certain purpose for use. In particular, the second section may be arranged bent from the first section, arranged in the direction towards the first longitudinal edge.

Preferably, the third frame side shows a third section with a first end and a second end, with the first end of the third section being arranged at the second end of the first section and the second end of the third section being arranged at the first end of the second section, with preferably the third section of the third frame side being arranged essentially parallel in reference to the longitudinal axis of the sheet-metal strip. The third section is therefore arranged between the first section and the second section. The third section represents another option to change the geometry of the recess. In particular in the event that the third section is arranged essentially parallel in reference to the longitudinal axis of the sheet-metal strip a longitudinal extension of the recess parallel to the longitudinal axis of the sheet-metal strip can be varied depending on a length of the third section.

The first frame side shows advantageously at least one first section with a first end and a second end and a second section with a first end and a second end, with the first end of the first section being arranged at the first longitudinal edge of the sheet-metal strip and the second end of the first section being arranged at the first end of the second section, the second end of the second section being arranged at the first end of the second frame side, and the first section being arranged at an angle, which is smaller than 180° in reference to the second section. Preferably the first section of the first frame side is arranged perpendicular in reference to the longitudinal axis of the sheet-metal strip. With the first section and the second section of the first frame side, here an embodiment of the undercut can be varied and particularly the stability of the free end of the hook-shaped fastening element can be enhanced.

Preferably the first frame side shows a third section with a first end and a second end, with the first end of the third section being arranged at the second end of the first section, and the second end of the third section being arranged at the first end of the second section, with preferably the third section of the first frame side essentially being arranged parallel to the longitudinal axis of the sheet-metal strip. The third section is therefore arranged between the first section and the second section. In particular, the third section may extend parallel to the longitudinal axis of the sheet-metal strip.

The hook-shaped fastening elements are advantageously punched from a sheet-metal strip. Using punching methods, the recess forming the hook-shaped fastening element can be produced in a particularly simple, cost-effective, and fast way.

The simulation cabinet according to the invention, comprising an interior vessel like the one described above and a housing, is characterized in that the housing shows engagement elements, which can be engaged by the hook-shaped fastening elements. Here, the engagement elements show preferably a form corresponding to the hook-shaped fastening elements. The cooperation of the hook-shaped fastening elements and the engagement elements corresponding thereto represents a particularly simple concept for the fastening of an interior vessel to a housing of a simulation cabinet. By the hook-shaped fastening the interior vessel can be sup-ported floating in the housing of the simulation cabinet, providing a simple assembly of the interior vessel at the housing.

Preferably at least one sheet-metal strip is arranged at the housing with a first longitudinal edge and a second longitudinal edge, each essentially parallel in reference to a longitudinal axis of the sheet-metal strip, with the sheet-metal strip comprising at least one, preferably several projections, each forming an engagement element. An engagement element is realized by the projection, with said projection being able to engage the recess of the hook-shaped fastening element.

The sheet-metal strip is advantageously arranged at an angle at the housing, with preferably the second longitudinal edge of the sheet-metal strip being arranged at the housing and the angle particularly measuring essentially 90°. By such an arrangement, particularly when the hook-shaped fastening element is also arranged at an angle at the interior vessel, a hook-shaped connection can be generated in a particularly simple fashion.

Advantageously, the sheet-metal strip is arranged at a first side wall of the housing and another sheet-metal strip at a second side wall of the housing opposite the first side wall. The interior vessel can therefore be fastened at two opposite side walls of the housing, resulting in a particularly stable fastening of the interior vessel at the housing.

According to a preferred embodiment of the invention the first longitudinal edge shows an undercut formed by the projection. When fastening the interior vessel at the housing the un-dercut of the engagement element can engage the undercut of the hook-shaped fastening ele-ments, formed by the recess, and thus provide a particularly simple fastening option.

In a preferred embodiment of the invention the projection shows a frame with at least: a first frame side with a first end and a second end, and a second frame side with a first end and a second end, with the first end of the first frame side being arranged at the first longitudinal edge of the sheet-metal strip and the first frame side being arranged at a first angle, which is smaller or equal to 90° in reference to the first longitudinal edge, and the first end of the second frame side is arranged at the second end of the first frame side and the second end of the second frame side is arranged at the first longitudinal edge. The second end of the second frame side is here particularly arranged at the longitudinal edge of the sheet-metal strip at a point, which is different from a point at which the first end of the first frame side is arranged at the longitudinal edge. During the production of the hook-shaped connection between the hook-shaped fastening element and the corresponding engagement element, due to a first frame side arranged in this fashion, contact areas may be reduced between the hook-shaped fastening element and the engagement element and thus potential heat bridges as well. An insertion slope can be formed by arranging the first frame side at an acute angle in reference to the first longitudinal edge.

The first frame side advantageously shows at least a first section with a first end and a second end, and a second section with a first end and a second end, with the first end of the first section being arranged at the first longitudinal edge of the sheet-metal strip and the second end of the first section being arranged at the first end of the second section, with the first section preferably being arranged perpendicular in reference to the longitudinal edge of the sheet-metal strip, the second end of the second section being arranged at the first end of the second frame side, and the first section being arranged at an angle, which is smaller than 180° in reference to the second section. The first section may particularly provide a support area for the hook-shaped fastening element when generating the hook-shaped connection. The second section may form an insertion slope for the hook-shaped fastening element to be engaged Preferably the first frame side shows a third section with a first end and a second end, with the first end of the third section being arranged at the second end of the first section, and the second end of the third section being arranged at the first end of the second section, with preferably the third section of the first frame side essentially being arranged parallel to the longitudinal axis of the sheet-metal strip. The third section is therefore arranged between the first section and the second section of the first frame side. A lateral stabilization of an engaged hook-shaped fastening element can be yielded with the third section.

The second frame side advantageously shows at least one first section with a first end and a second end, and a second section with a first end and a second end, with the first end of the first section being arranged at the first end of the second frame side, with the first section preferably being arranged parallel in reference to the longitudinal axis of the sheet-metal strip, the second end of the second section being arranged at the first longitudinal edge, and the first section being arranged at an angle in reference to the second section, which is smaller than 180°.

Preferably the second frame side comprises a third section with a first end and a second end, with the first end of the third section being arranged at the first end of the second frame side and the second end of the third section being arranged at the first end of the first section of the second frame side, with preferably the third section being arranged perpendicular in reference to the longitudinal axis of the sheet-metal strip. The first end of the third section is therefore the first end of the second frame side and the first section follows the third section. Based on the third section, which is arranged particularly perpendicular in reference to the longitudinal axis of the sheet-metal strip, the resistance when inserting the interior vessel into the housing can be avoided, for example in the form of a tip formed by the first section and the first frame side, and thus also any risk for injuries.

In general, the frame sides of the undercut and/or the projections may be embodied in a straight or a curved fashion. The sections at which the frame sides abut may be embodied in a rounded fashion.

Preferably the housing comprises at least one engagement element, which the hook-shaped fastening element can engage from a first direction, and at least a second engagement element, which the hook-shaped element can engage from a second direction, opposite the first direction, with particularly the first and the second engagement element being embodied mirror-symmetrical in reference to each other.

According to a preferred embodiment of the invention the engagement element is embodied such that the hook-shaped fastening element can engage the engagement element from two opposite directions, particularly such that the engagement element shows a symmetrical form in reference to a lateral axis arranged perpendicular in reference to the longitudinal axis of the sheet-metal strip.

These embodiments allow that the hook-shaped fastening elements of the interior vessel can also engage the engagement element of the housing when the sheet-metal strip is rotated by 180° about the lateral axis. In particular, this way a sheet-metal strip can be used at both sides of the housing.

The first longitudinal edge advantageously comprises at least a first section and at least a second section, with a distance of the first section from a second longitudinal edge being shorter than a distance of the second section from the second longitudinal edge, and with the projection being arranged at the second section. Upon engaging such an engagement element with a corresponding hook-shaped fastening element, the hook-shaped fastening element engages in the area of the second section of the first longitudinal edge. This way, the contact area of the fastening elements overall can be minimized. Such a minimization of the contact areas of the fastening elements is particularly advantageous with regards to heat loss or the transfer of cold temperatures.

Advantageously the engagement elements are punched out of a sheet-metal strip. By way of punching, the engagement elements can be produced in a particularly simple, cost effective, and little time consuming fashion.

Advantageously the number of engagement elements is not greater than a number of hook-shaped fastening elements, so that every engagement element can engage a corresponding hook-shaped fastening element.

According to a further development of the invention the level, in which the engagement element is provided, with a level in which the hook-shaped fastening element is located, in the engaged state of the hook-shaped fastening element and the engaging element forms an angle, preferably an angle of essentially 90°. This way, the engaging elements and the hook-shaped fastening elements are not located in one level, which additionally contributes to minimize the contact area between the engagement elements and the hook-shaped fastening elements.

DETAILED DESCRIPTION OF THE FIGURES

Figure 1:
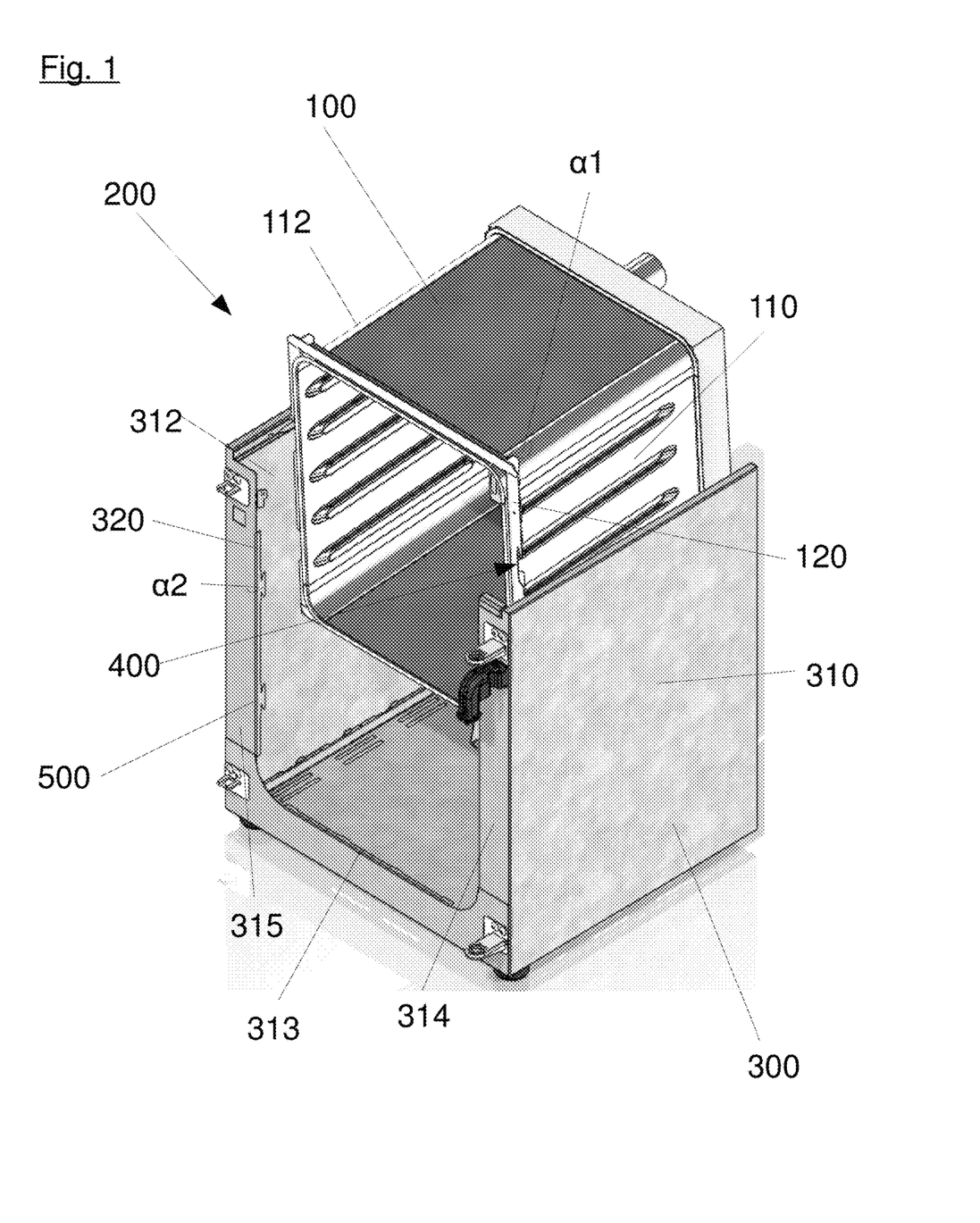
FIG. 1 is a line drawing evidencing a perspective view of an exemplary embodiment of a simulation cabinet with an exemplary embodiment of an interior vessel and a housing.

FIG. 1 shows a perspective view of a simulation cabinet 200, which comprises an interior vessel 100 and a housing 300.

The interior vessel 100 may show the form of a cuboid with an interior chamber, with the interior vessel 100 being limited by five side walls, so that one side wall of the interior vessel is open, hereinafter called the door side.

The housing 300 of the simulator cabinet 200 shows the form and size respectively, allowing the insertion of the interior vessel 100 into the housing 300. A door element may be arranged
at a side wall of the housing 300 to open and close the simulation cabinet 200. The interior vessel 100 is inserted into the housing 300 such that the door side of the interior vessel 100 is arranged at the side wall of the housing 300 with the door element. When the door element is open, thus through the door side of the interior vessel 100, access is possible to the inner chamber of the interior vessel 100.

The housing 300 is limited by five side walls. In particular, the housing 300 comprises a first side wall 310 and a second side wall 312, arranged opposite the first side wall 310, between which a third side wall 313 with a frame for the door element is arranged, essentially perpendicular in reference to the first side wall 310 and the second side wall 312. The frame shows a first frame side 314 and a second frame side 315, arranged opposite the first one, each respectively extending parallel in reference to an edge in which the first side wall 310 and/or the second side wall 312 of the building 300 abut the third side wall 313. A sheet-metal strip 330 is arranged at the frame side 314 and a sheet-metal strip 320 at the frame side 315, with only the sheet-metal strip 320 being discernible due to the perspective view of FIG. 1. Engagement elements 500 are arranged at each of the sheet-metal strips 320 and 330, which can be engaged by the respectively hook-shaped fastening elements 400 during the fastening of the interior vessel 100 at the housing 300. The engagement elements 500 are each also shown in FIGS. 4 and 5a to 5e. In FIG. 1 the interior vessel 100 has not yet been fastened at the housing 300.

Figure 2:
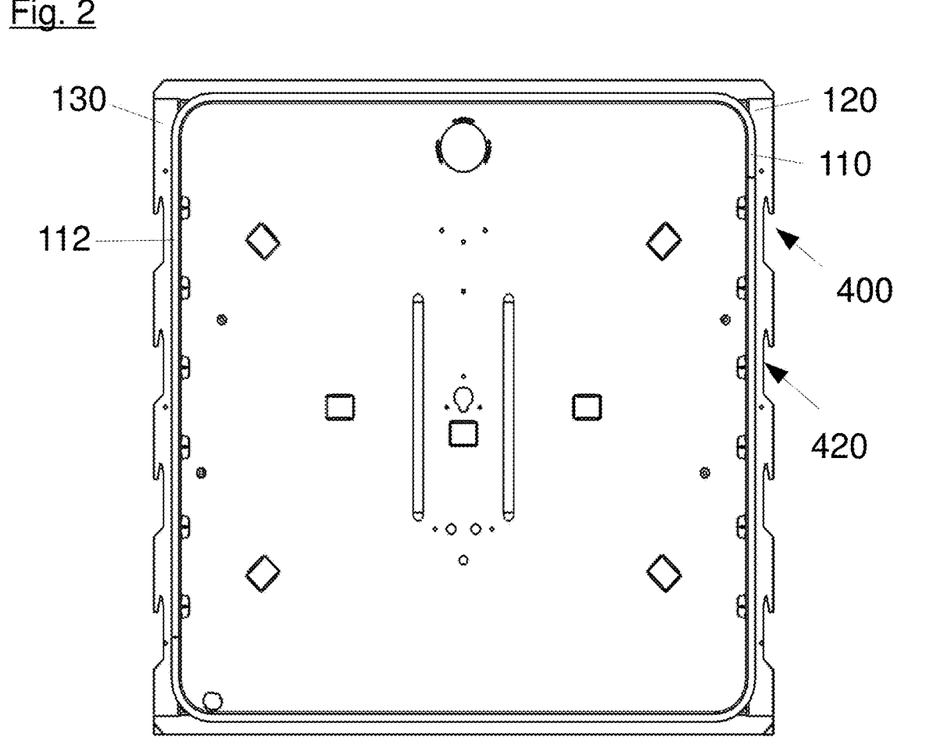
FIG. 2 is a line drawing evidencing a top view of a side wall of the interior vessel according to FIG. 1.

At a first side wall 110 and a second side wall 112 of the interior vessel 100, located opposite the first side wall 110, respectively one sheet-metal strip 120 and one sheet-metal strip 130 are arranged each with several, for example four hook-shaped fastening elements 400, as discernible from FIG. 2. Here, the sheet-metal strip 130 is arranged opposite the sheet-metal strip 120. A longitudinal axis 123 of the sheet-metal strip 120 and preferably also a longitudinal axis 123 of the sheet-metal strip 130 extend parallel to an edge of a first side wall 110 and/or the second side wall 112, each arranged at a respective edge of the door side of the interior vessel 100. The length of the sheet-metal strips 120 and 130 may essentially be equivalent to a length of said edge. The sheet-metal strips 120 and 130 may be arranged in the area of this edge at the first side wall 110 and/or the second side wall 112 of the interior vessel 100 such that a second lateral edge 122 of the sheet-metal strip 120 and 130 is arranged at the interior vessel 100 and the sheet-metal strip 120, 130 is arranged at an angle α1 in reference to the side wall 110, 120 which amounts preferably to 90°.

The number of hook-shaped fastening elements 400 per sheet-metal strip 120 or 130 is variable. At least two hook-shaped fastening elements 400 each at the first and second side wall 110 and 112 are sufficient for a stable fastening of the interior vessel 100 at the housing 300. FIGS. 3a to 3e respectively show a detail of the sheet-metal strip 120.

The sheet metal strip 120 comprises a first lateral edge 121 in addition to the second longitudinal edge 122. The second longitudinal edge 122 is arranged parallel in reference to the longitudinal axis 123. The first longitudinal edge 121 is arranged at least sectionally parallel in reference to the longitudinal axis 123. The first longitudinal edge 121 is arranged outside in reference to the side wall 110. The sheet-metal strip 120 comprises four recesses 410, with one each being shown in FIGS. 3a to 3f in various embodiments.

Each of the recesses 410 shows a frame 420. It is essential for the invention that the frame 420 shows a first frame side 421, a second frame side 422, and a third frame side 423, cf. FIG. 3a. A first end 421a of the first frame side 421 is here arranged at the first longitudinal edge 121 and a second end 421b of the first frame side 421 is arranged at a first end 422a of the second frame side 422. The first frame side 421 is arranged in reference to the first longitudinal edge 121 at a first angle β1 and the second frame side 422 is arranged in reference to the first frame side 421 at a second angle γ1, with the second angle γ1 preferably being sized such that the second frame side 422 is arranged essentially perpendicular in reference to the longitudinal axis 123 of the sheet-metal strip 120. A first end 422b of the second frame side 422 is arranged at a first end 423a of the third frame side 423. A second end 423b of the third frame side 423 is arranged at the first longitudinal edge 121, namely particularly at a point which is different from a point of the first end 421a of the first frame side 421. This way, a recess 410 is formed, open towards the first longitudinal edge 121. The recess 410 further forms an undercut 405 by this embodiment, by which the hook-shaped fastening element 400 is formed. With the second frame side 422 the hook-shaped fastening element 400 is located on an engagement element 500 when generating the hook-shaped connection.

The invention provides various geometries for the recess 410 of the hook-shaped fastening element 400, namely by various embodiments of the frame 420.

Figure 3A:
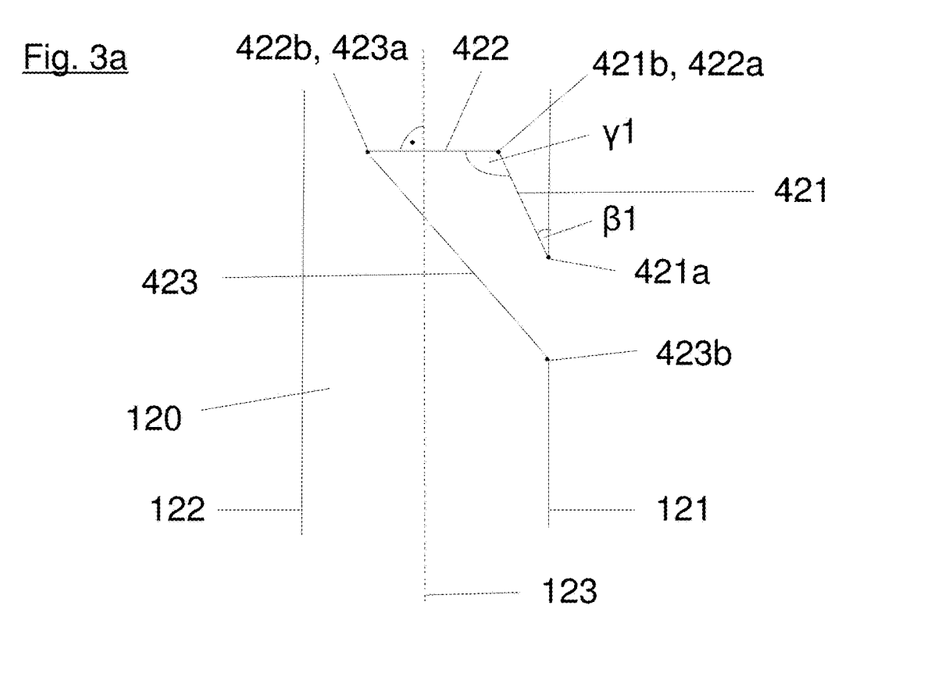
FIG. 3a is a line drawing evidencing an exemplary embodiment of a hook-shaped fastening element.
Figure 3B:
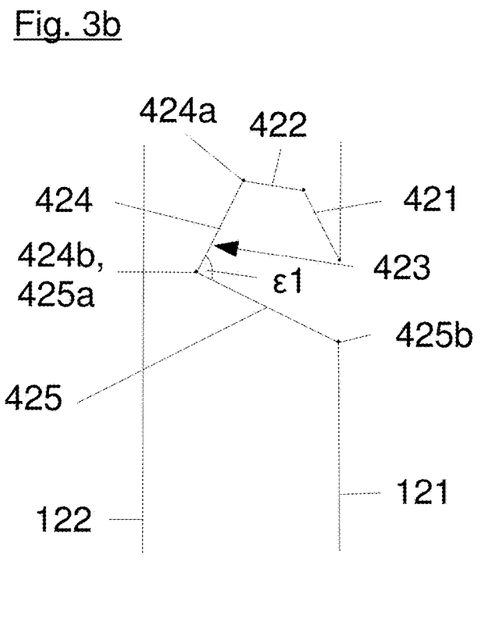
FIG. 3b is a line drawing evidencing another exemplary embodiment of a hook-shaped fastening element.

The exemplary embodiment shown in FIG. 3b differs from the exemplary embodiment shown in FIG. 3a such that the third frame side 423 may show several sections. For example, the third frame side 423 in FIG. 3b is shown with a first section 424 and a second section 425, with the first section 424 and the second section 425 forming an angle ε1, which may be smaller than 90°. A first end 424a of the first section 424 is arranged at the second end 422b of the second frame side 422 and a second end 424b of the first section 424 is arranged at a first end 425a of the second section 425. A second end 425b of the second section 425 is arranged at the first longitudinal edge 121 of the sheet-metal strip 120.

Figure 3C:
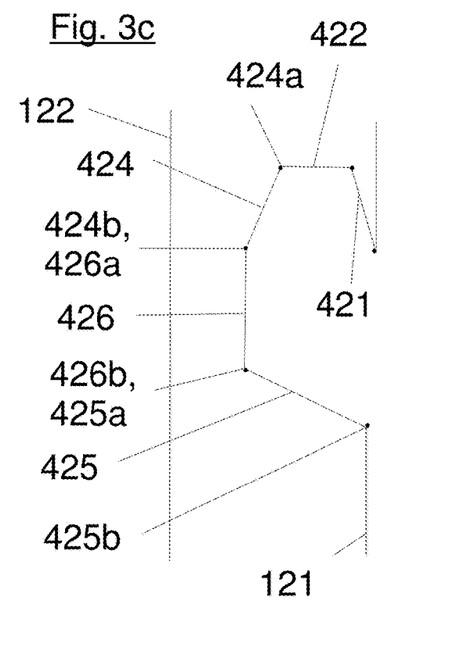
FIG. 3c is a line drawing evidencing another exemplary embodiment of a hook-shaped fastening element.

The exemplary embodiment shown in FIG. 3c differs from the exemplary embodiment shown in FIG. 3b such that a third section 426 is arranged between the first section 424 and the second section 425 of the third frame side 423. Here, a first end 426a of the third section 426 is arranged at the second end 424b of the second section 424 and a second end 426b of the third section 426 is arranged at the first end 425a of the second section 425. The third section 426 extends parallel in reference to the longitudinal axis 123 of the sheet-metal strip 120. Depending on the length of the third section 426, the extension of the recess 410 can be varied in the direction parallel in reference to the longitudinal axis 123 of the sheet-metal strip 120.

Figure 3D:
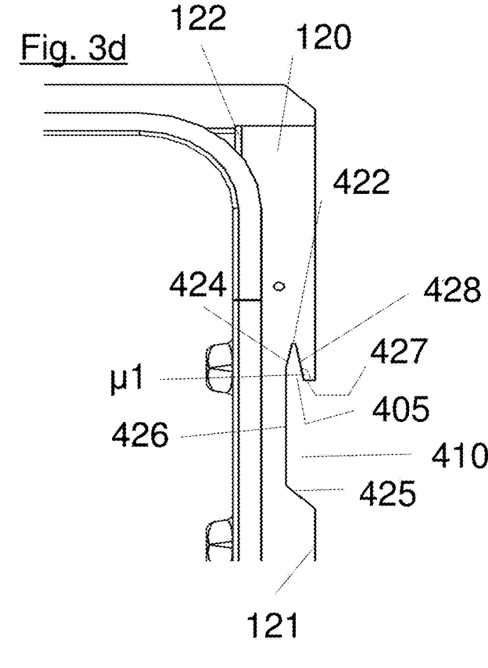
FIG. 3d is a line drawing evidencing an enlarged detail of FIG. 2 with another exemplary embodiment of a hook-shaped fastening element.
Figure 3E:
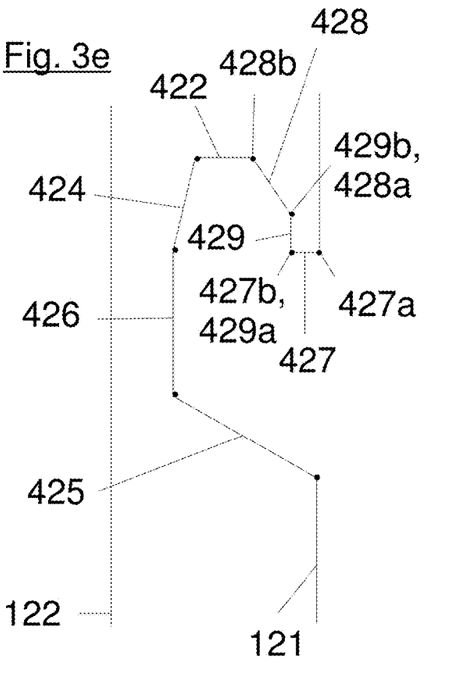
FIG. 3e is a line drawing evidencing another exemplary embodiment of a hook-shaped fastening element.

The exemplary embodiment shown in FIG. 3d differs from the exemplary embodiment shown in FIG. 3c such that the first frame side 421 shows a first section 427 and a second section 428. A first end 427a of the first section 427 is arranged at the first longitudinal edge 121 of the sheet-metal strip 120 and a second end 427b of the first section 427 is arranged at a first end 428a of the second section 428. The first section 427 is arranged at an angle of essentially 90° in reference to the longitudinal axis 123 of the sheet-metal strip 120. The second section 428 is arranged at an angle μ1 in reference to the first section 427, which is smaller than 180°. A second end 428b of the second section 428 is arranged at the first end 422a of the second frame side 422. In this exemplary embodiment particularly the first frame side 421 and the first section 424 of the third frame side 423 extend at an angle in reference to the longitudinal axis 123 and respectively form an obtuse interior angle with the second frame side 422. This way, clear areas are formed to the engagement element 500, abutting the second frame side 422, which reduces the contact areas.

The first frame side 421 may show more than two sections as well. The exemplary embodiment shown in FIG. 3e differs from the exemplary embodiment shown in FIG. 3d such that the first frame side 421 additionally comprises a third section 429, which is arranged between the first section 427 and the second section 428 of the first frame side 421. Here, a first end 429a of the third section 429 is arranged at the second end 427b of the first section 427 and a second end 429b of the third section 429 is arranged at the first end 428a of the second section 428. The third section 429 is arranged parallel in reference to the longitudinal axis 123 of the sheet-metal strip 120.

It is also within the scope of the invention that the frame side of the recess 410 may also be embodied in a curved fashion, at least sectionally. Furthermore, the areas in which sections are abutting may be embodied in a rounded fashion.

The engagement element 500 represents the counterpart of the hook-shaped fastening element 400, with various exemplary embodiments thereof being shown in FIGS. 4 and 5a to 5e. The engagement element 500 is formed by a projection 510 at the sheet-metal strip 320, 330.

The sheet-metal strip 320 comprises a first longitudinal edge 321, in addition to a second longitudinal edge 322, with which it forms an angle α2 at the housing, which amounts preferably to essentially 90°. The second longitudinal edge 322 is arranged parallel in reference to a longitudinal axis 323 of the sheet-metal strip 320. The first longitudinal edge 321 is arranged at least sectionally parallel in reference to the longitudinal axis 323 of the sheet-metal strip 320. The sheet-metal strip 320 comprises several projections 510, for example four, with respectively one of them being shown in various embodiments in FIGS. 5a to 5f.

Each of the projections 510 shows a frame 520. It is essential for the invention that the frame 520 shows a first frame side 521 and a second frame side 522, cf. FIG. 5a. A first end 521a of the first frame side 521 is here arranged at the first longitudinal edge 321 of the sheet-metal strip 320 and a second end 521b of the first frame side 521 is arranged at a first end 522a of the second frame side 522. The first frame side 521 is arranged in reference to the first longitudinal edge 321 at a first angle β2, which may represent an acute angle. The second end 522b of the second frame side 522 is arranged at the first longitudinal edge, namely particularly at a point which is different from a point at which the first end 521a of the first frame side 521 is arranged at the longitudinal edge 321. This way an engagement element 500 is formed, which the hook-shaped fastening element can engage.

The invention additionally provides for various geometries for the projection 510 of the engagement element 500, namely by different embodiments of the frame 520.

Figures 4, 5A:
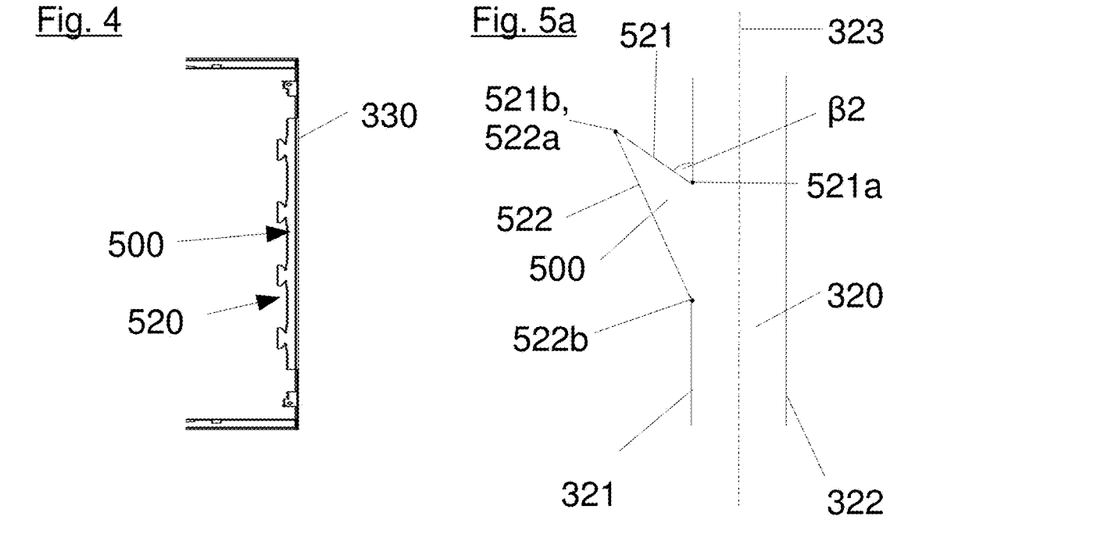
FIG. 4 is a line drawing evidencing a detail of a top view of an interior wall of the housing according to FIG. 1.
FIG. 5a is a line drawing evidencing an exemplary embodiment of an engagement element.
Figure 5B:
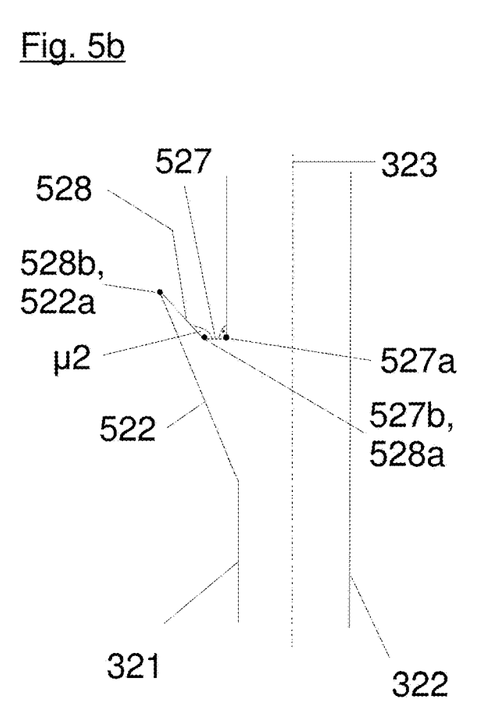
FIG. 5b is a line drawing evidencing another exemplary embodiment of an engagement element.

The exemplary embodiment shown in FIG. 5b differs from the exemplary embodiment shown in FIG. 5a such that the first frame side 521 may show several sections. For example, the first frame side 521 in FIG. 5b is shown with a first section 527 and a second section 528, with the first section 527 and the second section 528 forming an angle μ2, which is smaller than 180°. The first end 527a of the first section 527 is arranged at the first longitudinal edge 321 of the sheet-metal strip 320 and a second end 527b of the first section 527 is arranged at a first end 528a of the second section 528. A second end 528b of the second section 528 is arranged at the first end of 522a of the second frame side 522. The first section 527 is particularly arranged perpendicular in reference to the longitudinal axis 323 of the sheet-metal strip 320. The first section 527 forms a resting area for the hook-shaped fastening element 400. If the angle μ2 is smaller than 180° but greater than 90°, a planar contact of the second section 528 can be avoided with the hook-shaped fastening element 400.

Figure 5C:
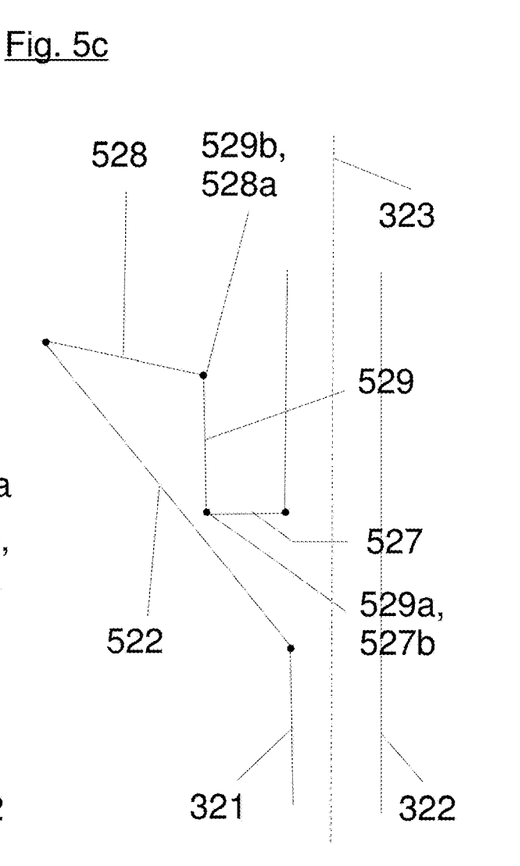
FIG. 5c is a line drawing evidencing another exemplary embodiment of an engagement element.

The exemplary embodiment shown in FIG. 5c differs from the exemplary embodiment shown in FIG. 5b such that a third section 529 is arranged between the first section 527 and the second section 528 of the first frame side 521. Here, a first end 529a of the third section 529 is arranged at the second end 527b of the first section 527 and a second end 529b of the third section 529 is arranged at the first end 528a of the second section 528. The third section 529 is therefore arranged between the first section 527 and the second section 528. The third section 529 extends parallel in reference to the longitudinal axis 323 of the sheet-metal strip 320 and can allow a lateral stabilization of the engaged hook-shaped fastening element 400.

Figure 5D:
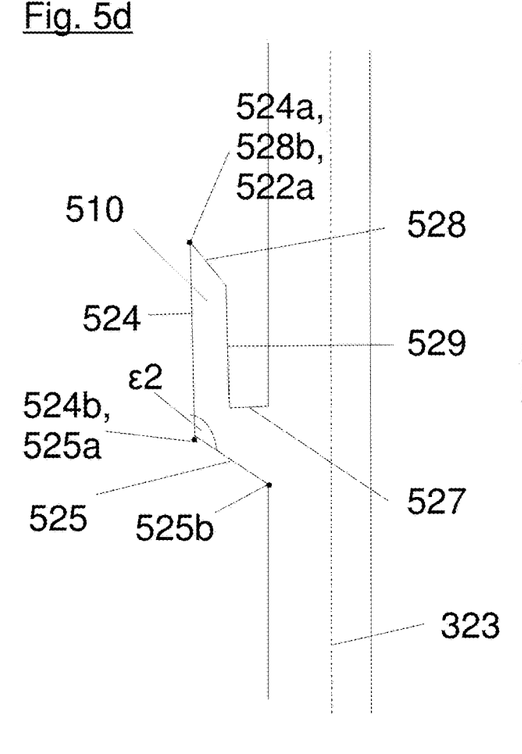
FIG. 5d is a line drawing evidencing another exemplary embodiment of an engagement element.

The exemplary embodiment shown in FIG. 5d differs from the exemplary embodiment shown in FIG. 5c such that the second frame side 522 shows a first section 524 and a second section 525, which form an angle ε2, which is smaller than 180°. A first end 524a of the first section 524 is arranged at the first end 522a of the second frame side 522, which in FIG. 5d also represents the second end 528b of the second section 528 of the first frame side 521. A second end 524b of the first section 524 is arranged at a first end 525a of the second section 525. A second end 525b of the second section 525 is arranged at the longitudinal edge 321 of the sheet-metal strip 320. The first section 524 is arranged parallel in reference to the longitudinal axis 323 of the sheet-metal strip 320.

Figure 5E:
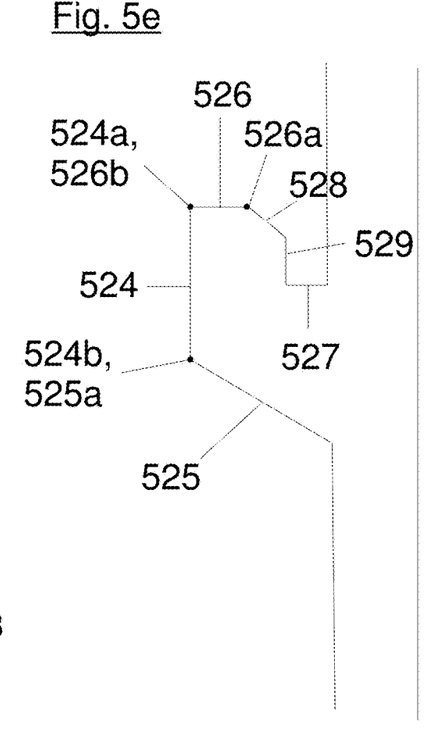
FIG. 5e is a line drawing evidencing another exemplary embodiment of an engagement element.

The exemplary embodiment shown in FIG. 5e differs from the exemplary embodiment shown in FIG. 5d such that the second frame side 522 shows an additional third section 526, with its first end 526a being arranged at the first end 522a of the second frame side 522. A second end 526b of the third section 526 is arranged at the first end 524a of the first section 524. The third section 526 is particularly arranged perpendicular in reference to the longitudinal axis 323 of the sheet-metal strip 320 and may increase the stability of the free end of the projection.

Figure 5F:
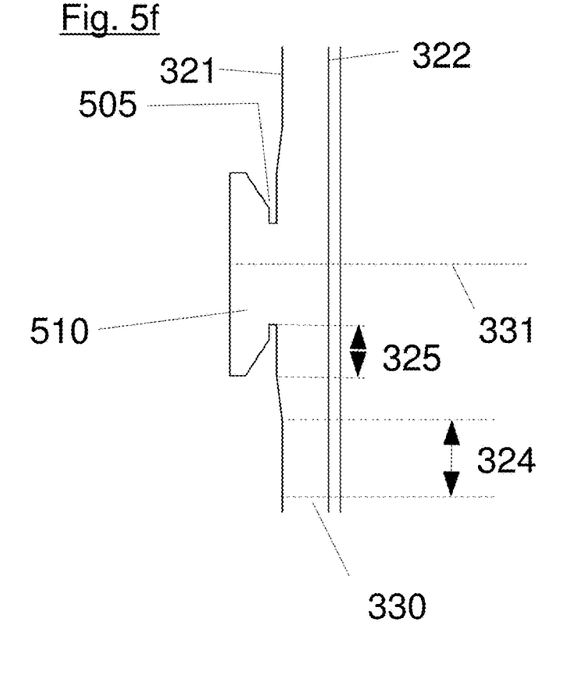
FIG. 5f is a line drawing evidencing an enlarged detail of FIG. 4 with another exemplary embodiment of an engagement element.

The engagement element 500 according to FIG. 5f shows a symmetric form in reference to the lateral axis 331 arranged perpendicular to the longitudinal axis 323. A hook-shaped fastening element can particularly engage the engagement element 500 from two opposite directions.

It is also within the scope of the invention that the frame sides of the projection 510 may be embodied as curved, at least sectionally. Furthermore, the areas in which sections are abutting may be embodied in a rounded fashion.

The hook of the hook-shaped fastening element 400 engages in an undercut 505 between the first frame side 521 and the first longitudinal edge 321 of the sheet-metal strip 320.

In one embodiment, the first longitudinal edge 321 of the sheet-metal strip 320 arranged at the housing 300 comprises at least a first section 324 and at least a second section 325, with the projections 510 being arranged at the second sections 325. The distance of the second section 325 of the first longitudinal edge 321 from the second longitudinal edge 322 of the sheet-metal strip 320 is greater than the distance of the first section 324 of the first longitudinal edge 321 from the second longitudinal edge 322. This arrangement of the two sections 324 and 325 results in the hook-shaped fastening element 400 only contacting the engagement element 500 in the second section 325, partially in a planar fashion, so that the contact area between the hook-shaped fastening element 400 and the engagement element 500 can be further reduced.

In the exemplary embodiments shown, the hook-shaped fastening elements 400 and the engagement elements 500 are punched out of the respective sheet-metal strips 120, 130, and 320, 330. By the punching process the hook-shaped fastening elements 400 and the engagement elements 500 can be produced in a particularly simple fashion.

Figure 6:
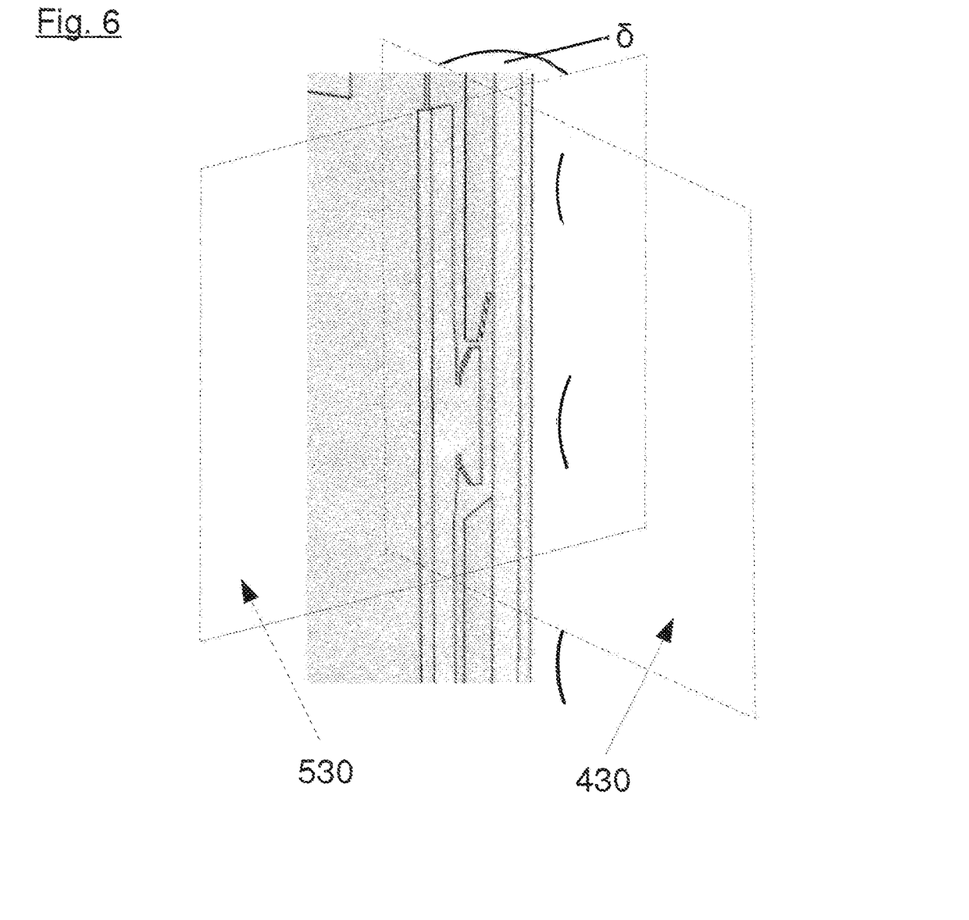
FIG. 6 is a line drawing evidencing an illustration of a hook-shaped fastening element according to FIG. 3d and an engagement element according to FIG. 5f prior to the engagement of the interior vessel at the housing of the simulation cabinet according to FIG. 1.

The sheet-metal strips 120 and 130 with the hook-shaped fastening elements are arranged in one level 430, cf. FIG. 6. The sheet-metal strips 320 and 330 are shown arranged in one level 530 with the engagement elements 500, as discernible from FIG. 6. In the assembled state of the interior vessel 100 in the housing 300 the levels 430 and 530 form an angle δ, with preferably the angle δ measuring 90°.

LIST OF REFERENCE NUMBERS 100 interior vessel
110 first side wall
112 second side wall
120 sheet-metal strip 121 first longitudinal edge
122 second longitudinal edge
123 longitudinal axis
130 sheet-metal strip
200 simulation cabinet
300 housing
310 first side wall
312 second side wall
313 third side wall
314 first frame side
315 second frame side
320 sheet-metal strip
321 first longitudinal edge
322 second longitudinal edge
323 Longitudinal axis
324 first section
325 second section
330 sheet-metal strip
331 lateral axis
400 hook-shaped fastening element
405 undercut
410 recess
420 frame
421 first frame side
421a first end
421b second end
427 first section
427a first end
427b second end
428 second section
428a first end
428b second end
429 third section
429a first end
429b second end
422 second frame side
422a first end
s1 intersection
s2 intersection
s3 intersection
s4 intersection
α angle
β angle
x direction
y direction
g straight line
A axis of rotation The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. An interior vessel of a simulation cabinet, wherein the interior vessel is cuboid, comprises a door side with one open side wall and further comprises at least two hook-shaped fastening elements arranged for fastening at a housing of the simulation cabinet, further comprising at least one sheet-metal strip comprising a first longitudinal edge and a second longitudinal edge, each essentially parallel in reference to a longitudinal axis of the at least one sheet-metal strip, with the at least one sheet-metal strip comprising two or more recesses, each recess forming one of the hook-shaped fastening elements, and wherein the at least one sheet-metal strip is arranged at the interior vessel, wherein each recess shows a frame comprising at least:
a first frame side with a first end and a second end,
a second frame side with a first end and a second end,
a third frame side with a first end and a second end,
with
the first end of the first frame side being arranged at the first longitudinal edge of the at least one sheet-metal strip and the first frame side being arranged at a first angle ($\beta 1$), which is smaller or equal to 90°, in reference to the first longitudinal edge,
the first end of the second frame side being arranged at the second end of the first frame side and the second frame side being arranged at a second angle ($\gamma 1$), which is smaller than 180°, in reference to the first frame side, essentially perpendicular in reference to the longitudinal axis of the at least one sheet-metal strip, and
the first end of the third frame side being arranged at the second end of the second frame side and the second end of the third frame side being arranged at the first longitudinal edge, and
wherein the third frame side comprises at least
a first section with a first end and a second end and
a second section with a first end and a second end,
with
the first end of the first section being arranged at the second end of the second frame side,
the second end of the second section being arranged at the first longitudinal edge, and
the first section being arranged at an angle ($\varepsilon 1$), which is smaller than 180° in reference to the second section.

2. The interior vessel according to claim 1, wherein the at least one sheet-metal strip is arranged at an angle ($\alpha 1$) measured from a first side wall and a second side wall of the interior vessel, with the second longitudinal edge of the at least one sheet-metal strip being arranged at the interior vessel and the angle ($\alpha 1$) amounting essentially to 90°.

3. The interior vessel according to claim 1, wherein the at least one sheet-metal strip comprises a first sheet-metal strip arranged at a first side wall of the interior vessel and another sheet-metal strip arranged at a second side wall of the interior vessel opposite the first side wall.

4. The interior vessel according to claim 1, wherein the first longitudinal edge shows an undercut formed by one of the two or more recesses.

5. The interior vessel according to claim 1, wherein the third frame side comprises a third section with a first end and a second end, with the first end of the third section being arranged at the second end of the first section and the second end of the third section being arranged at the first end of the second section, with the third section of the third frame side being arranged essentially parallel in reference to the longitudinal axis of the at least one sheet-metal strip.

6. A simulation cabinet with an interior vessel according to claim 1 and a housing, wherein the housing comprises engagement elements, each of which can be engaged by a hook-shaped fastening element.

* * * * *

UNITED STATES PATENT AND TRADEMARK OFFICE
CERTIFICATE OF CORRECTION

PATENT NO. : 10,603,663 B2  
APPLICATION NO. : 14/963524  
DATED : March 31, 2020  
INVENTOR(S) : Verdat Demirkaya

Page 1 of 1

It is certified that error appears in the above-identified patent and that said Letters Patent is hereby corrected as shown below:

On the Title Page

Item (73), should read:  
Assignee: BINDER GmbH, Tuttlingen (DE)

Signed and Sealed this  
Thirtieth Day of June, 2020

Andrei Iancu  
*Director of the United States Patent and Trademark Office*